US006734922B1

(12) United States Patent
Seo (10) Patent No.: US 6,734,922 B1
(45) Date of Patent: May 11, 2004

(54) BASE ASSEMBLY FOR VIDEO DISPLAY APPLIANCE

(75) Inventor: Young Ho Seo, Daegu Metropolitan (KR)

(73) Assignee: LG Electronics Inc., Seoul (KR)

( * ) Notice: Subject to any disclaimer, the term of this patent is extended or adjusted under 35 U.S.C. 154(b) by 242 days.

(21) Appl. No.: 09/680,214

(22) Filed: Oct. 6, 2000

(30) Foreign Application Priority Data

Oct. 8, 1999 (KR) .......................................... 1999-43505

(51) Int. Cl.[7] .......................... H04N 5/645; A47G 29/00
(52) U.S. Cl. ........................ 348/825; 248/371; 248/923
(58) Field of Search ................................ 348/825, 826, 348/836, 843; 248/920, 923, 371, 129, 130, 133, 178.1, 183.3, 184.1, 917, 346, 456, 359, 166, 688

(56) References Cited

U.S. PATENT DOCUMENTS

| | | | | |
|---|---|---|---|---|
| 4,558,648 A | * | 12/1985 | Franklin et al. ............ 108/147 |
| 4,624,433 A | * | 11/1986 | Henneberg ............. 248/346.06 |
| 4,989,813 A | * | 2/1991 | Kim et al. ................ 248/184.1 |
| 5,501,420 A | * | 3/1996 | Watt et al. ............. 248/280.11 |
| 6,462,939 B1 | * | 10/2002 | Heirich ........................ 361/682 |

* cited by examiner

Primary Examiner—Michael H. Lee
(74) Attorney, Agent, or Firm—Fleshner & Kim, LLP (57) ABSTRACT

Disclosed is a base assembly for a video display appliance capable of easily adjusting a tilting angle and a swiveling angle of a monitor. The base assembly comprises a front base having a coupler coupled to a bottom of the monitor, and moving means for rolling on a ground; a rear base pivotally engaged to a rear of the front base; and a resilient hinge assembly, engaged to the rear of the front base and a front of the rear base, for changing a tilting angle of the monitor according to an operating force applied upward or downward to the monitor.

29 Claims, 9 Drawing Sheets

FIG. 1

PRIOR ART

BASE ASSEMBLY FOR VIDEO DISPLAY APPLIANCE

BACKGROUND OF THE INVENTION

1. Field of the Invention

The present invention relates to a base assembly for a video display appliance having a monitor, and more particularly to a base assembly for a video display appliance capable of supporting the monitor.

2. Description of the Related Art

Figure 1:
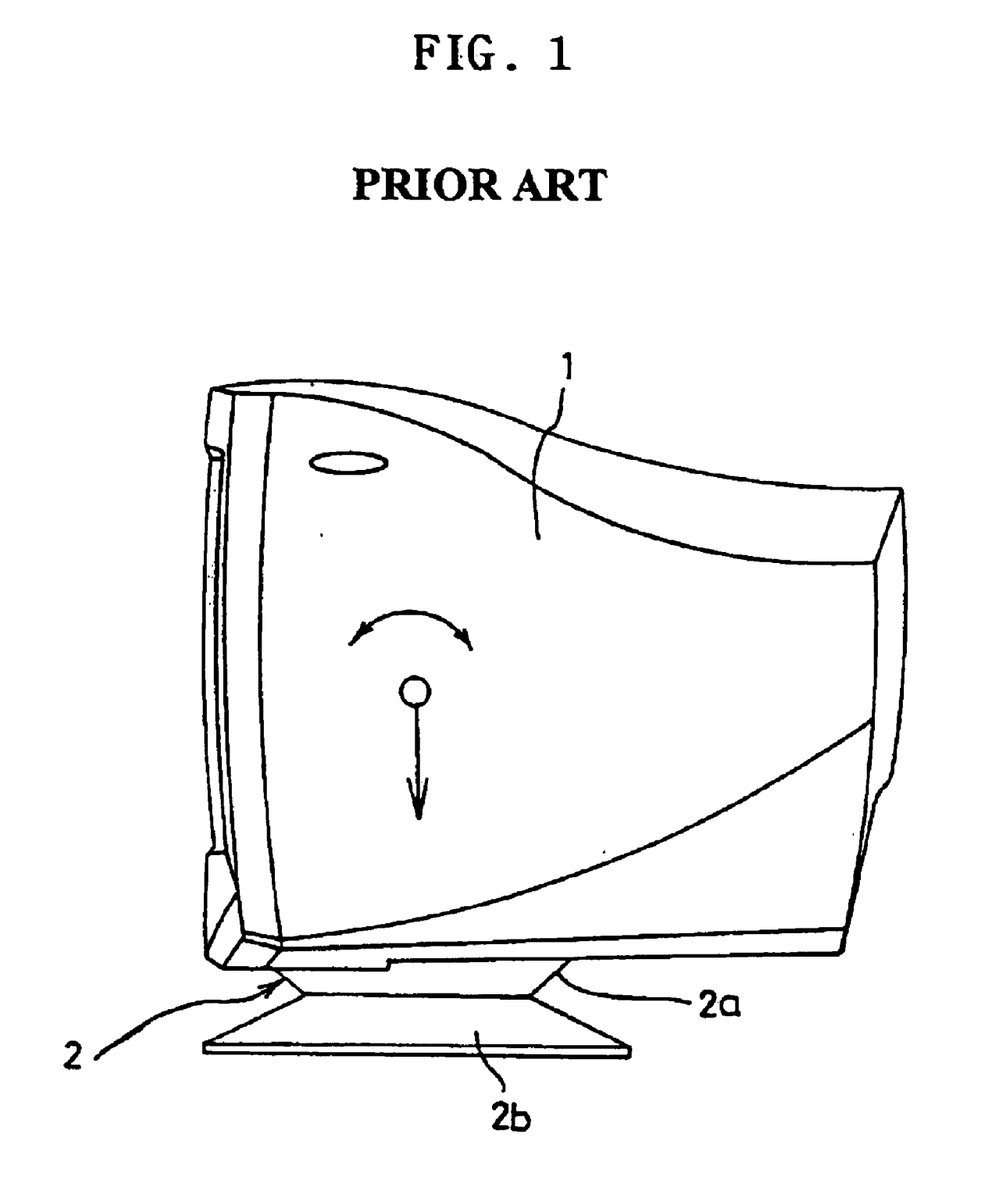
FIG. 1 is a side view illustrating a prior art video display appliance.

Generally, video display appliances, as shown in FIG. 1, comprise a monitor 1 and a monitor base 2 for supporting the monitor.

The monitor base 2 includes a spherical upper base 2a integrally formed with a lower portion of the monitor 1, and a lower base 2b, coupled to the upper base, for supporting the monitor 1 and the upper base 2a. The upper and lower bases 2a and 2b are coupled to each other in such a way that the upper base is movable in a desired direction relative to the lower base to adjust a tilting and swiveling angle of the monitor.

With the construction described above, the tilting and swiveling angle of the monitor is adjusted as follows.

To adjust the tilting angle of the monitor, a user pushes or pulls a front lower portion of the monitor with one hand, while the user presses an upper surface of the monitor 1 or the lower base 2b against a table with the other hand.

Also, to adjust the swiveling angle of the monitor, the user turns the monitor in a left or right direction with one hand, while the user presses the lower base against the table with the other hand.

Specifically, the tilting and swiveling angle of the monitor may be adjusted with the relative (sliding) movement of the upper base 2a and the lower base 2b in response to the force acting on the monitor in a desired direction.

With the construction of the prior monitor base, the upper base 2a has to have a spherical shape to achieve the relative movement with the lower base 2b, and the base has to be positioned on an axis vertically passing through a center of gravity of the monitor 1 to maintain a moment equilibrium of the monitor. Therefore, such a positioning limit of the monitor causes a cumbersomeness of usage and a difficulty of design.

For example, since the monitor is supported by contact with the base only, if the user wants to adjust the tilting or swiveling angle of the monitor, the user has to apply a significant force to the monitor.

The adjustment of the tilting angle of the monitor is explained briefly herein. However, the user cannot adjust the tilting angle of the prior monitor by merely applying the operating force to the monitor toward an upper or lower direction. Therefore, in order to adjust the tilting angle of the monitor, the user has to rotate the monitor in a left or right direction, and simultaneously, has to push up or pull down on the monitor.

Specifically, since the tilting angle of the prior monitor base cannot be adjusted by merely applying the operating force toward the upper or lower direction, the user applies a composite operating force comprising a tilting force and a rotating force to the monitor.

In addition, since no prior monitor base itself has means for moving the monitor, the user has to lift up the monitor to transfer it to an adjacent position.

A general tendency, that the size of the monitor becomes large and the use of the heavy monitor such as a flat monitor is increased, brings into relief such a drawback.

SUMMARY OF THE INVENTION

To resolve the above problems, an object of the present inventions is to provide a base assembly for a video display appliance having a construction capable of easily adjusting a tilting and swiveling angle of a monitor.

Another object of the present invention is to provide a base assembly for a video display appliance capable of easily transferring the monitor from one position to another position.

To achieve the above objects, according to one aspect of the present invention, there is provided a base assembly for a video display appliance having a monitor, the base assembly comprising: a front base having a coupler coupled to a bottom of the monitor, and moving means for rolling on a ground; a rear base pivotally engaged to a rear of the front base; and a resilient hinge assembly, engaged to the rear of the front base and a front of the rear base, for changing a tilting angle of the monitor according to an operating force applied upward or downward to the monitor.

BRIEF DESCRIPTION OF THE DRAWINGS

The above objects, other features and advantages of the present invention will become more apparent by the preferred embodiment described with reference to the accompanying drawings, in which:

FIGS. 8A to 8C are side views illustrating the adjusting operation of a tilting angle of a base assembly according to the present invention, in which FIG. 8A shows a state in which a monitor is maintained horizontally, FIG. 8B shows a state in which the monitor is tilted in a front direction, and FIG. 8C shows a state in which the monitor is tilted in a rear direction.

DETAILED DESCRIPTION OF THE PREFERRED EMBODIMENT

A preferred embodiment of the base assembly according to the present invention will now be explained with reference to the accompanying drawings.

Figure 2:
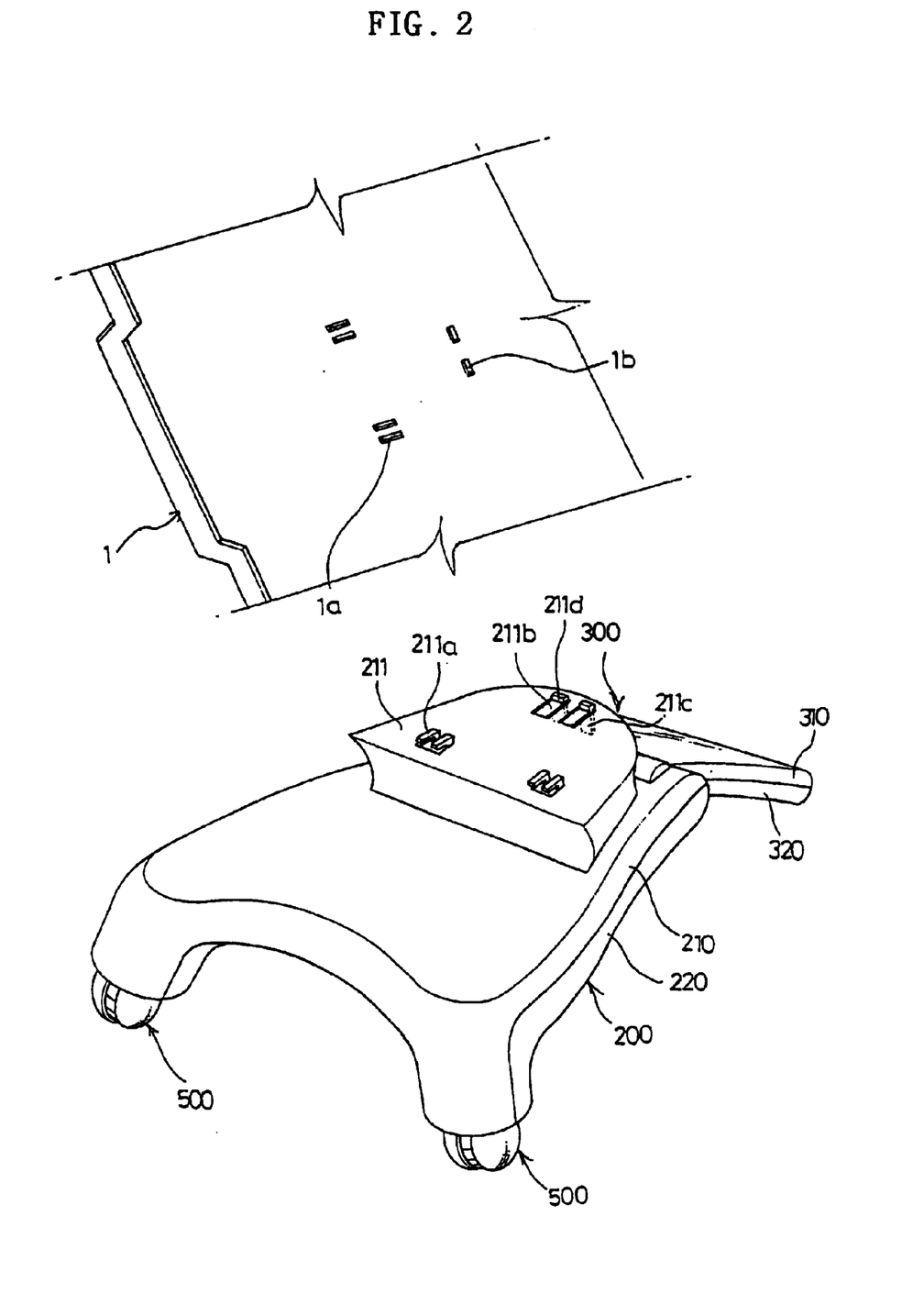
FIG. 2 is a perspective view illustrating a base assembly according to one preferred embodiment of the present invention, in which the base assembly is shown together with a portion of a bottom of a monitor to illustrate the connection relationship between the monitor and the base assembly.
Figure 3:
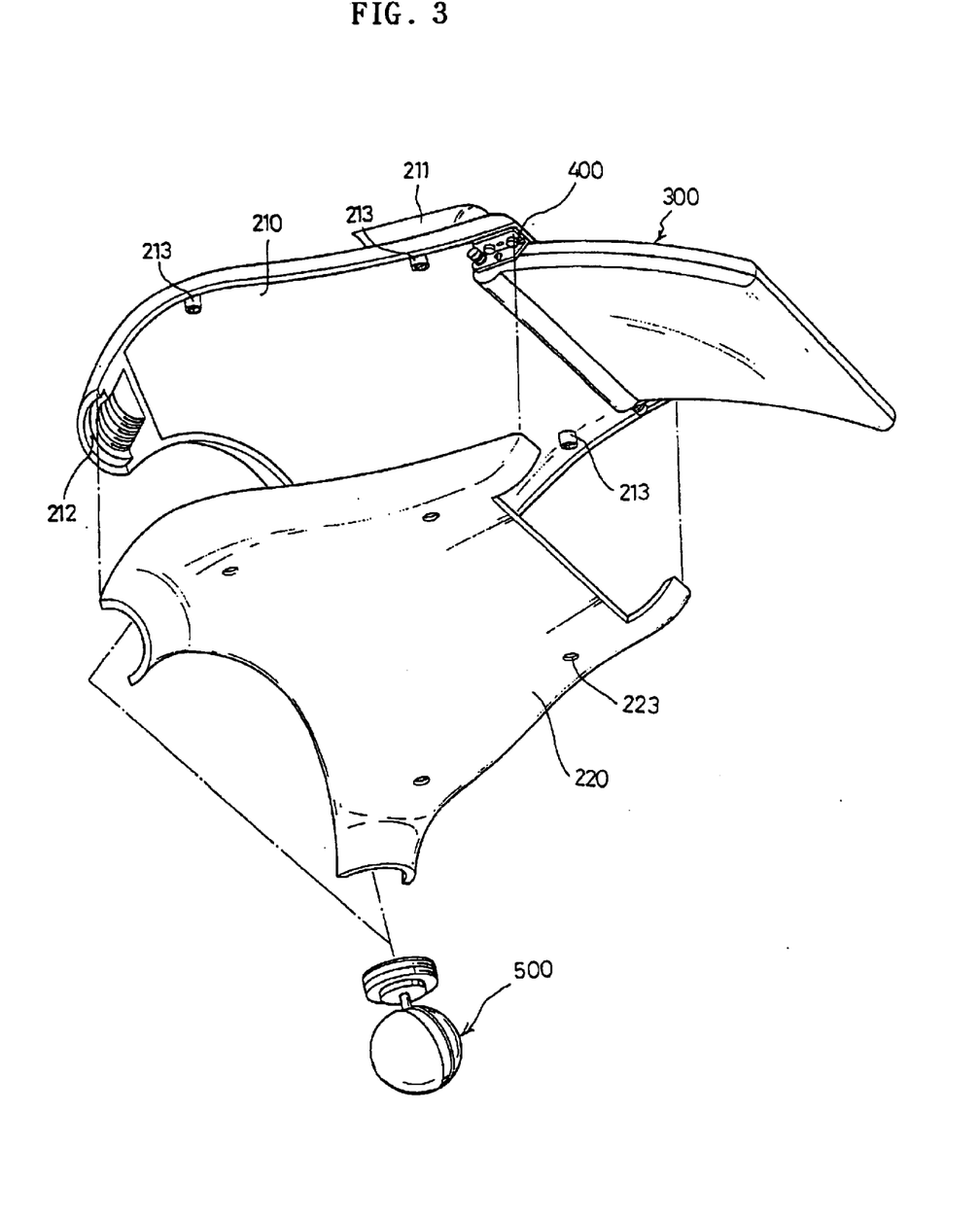
FIG. 3 is an exploded view of an upper cover and a lower cover of a front base assembly in FIG. 2.
Figure 4:
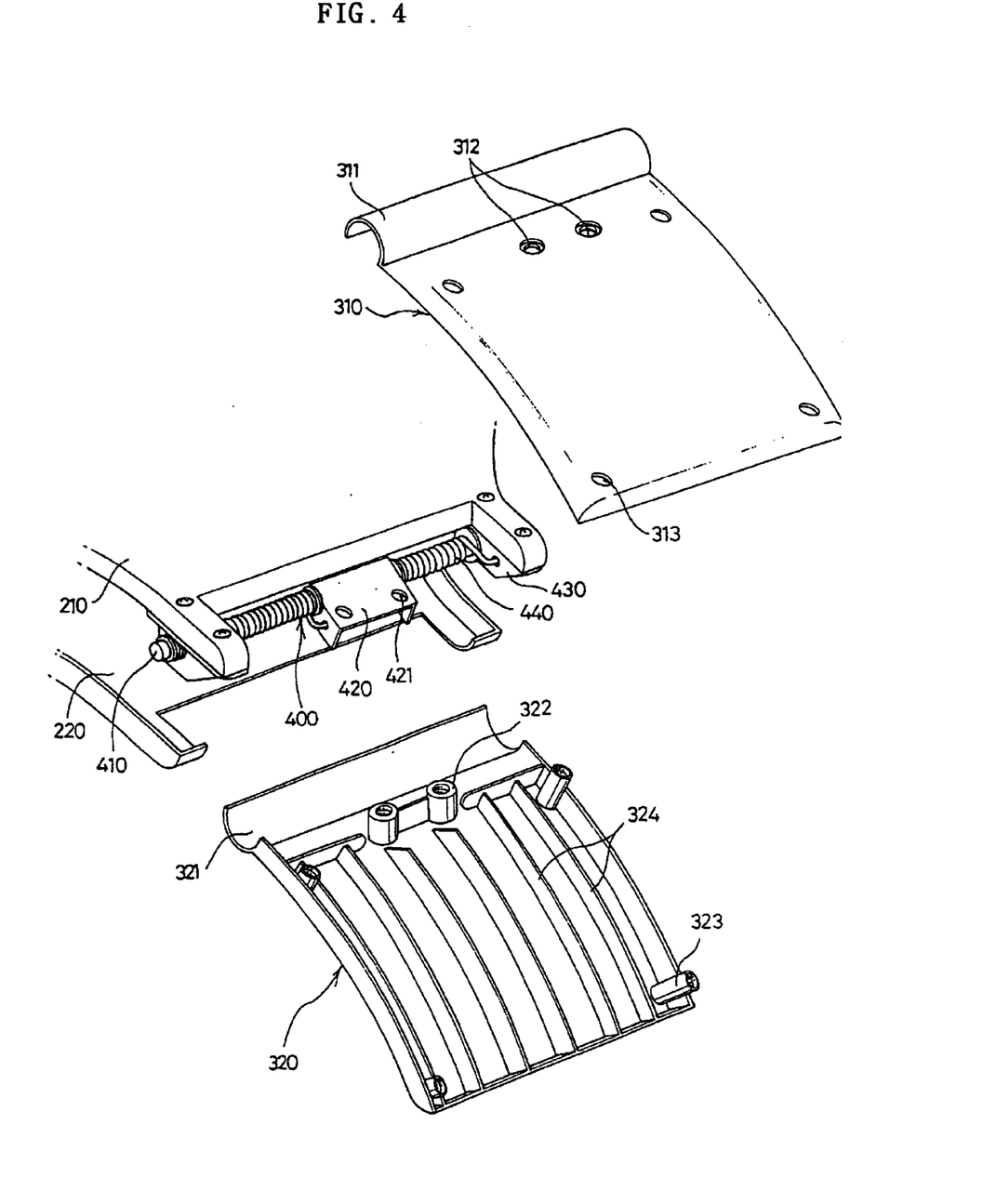
FIG. 4 is an exploded view illustrating the state in which the rear base in FIG. 2 is coupled to a resilient hinge assembly.

A base assembly 2 for a video display appliance according to one preferred embodiment of the present invention, as shown in FIGS. 2 to 4, comprises a front base 200 coupled to a monitor 1, a rear base 300 engaged to a rear end of the front base 200 through a resilient hinge assembly 400 to adjust a tilting angle of the monitor 1 by an operating force applied upward or downward to the monitor, and moving means 500, mounted onto a front of the front base 200, for moving the monitor.

The front base 200 includes an upper cover 210 coupled to a bottom of the monitor, and a lower cover 220 having a shape corresponding to that of the upper cover 210 to engage with the upper cover. A coupler 211 coupled to the bottom of the monitor is integrally formed on an outer upper surface of the upper cover 210.

The front base 200, as shown in FIGS. 2 and 3, includes a threaded portion 212 each inside both front sides, so that the moving means is threadedly fastened to the threaded portion. Fixing bosses (not shown) are formed on both sides of a rear end of the upper cover 210, so that the resilient hinge assembly 400 is mounted on the upper cover 210 through the fixing bosses.

The upper cover 210 is provided at each bottom corner thereof with a number of fastening bosses 213 for fastening the upper cover 210 to the lower cover 220. The lower cover 220 is provided at its inner side with a number of fastening holes each at a position corresponding to that of the fastening boss, such that the upper and lower covers 210 and 220 are engaged to each other by inserting a screw (not shown) into the fastening boss 213 through the fastening hole 223 and fastening the screw.

The upper cover 220 is provided on its inner side with a number of reinforcing ribs (not shown) in a vertical and horizontal direction to support the load of the monitor 1.

The coupler 211 provided on the upper cover 210 has on its front portion a number of hook-shaped fastening brackets 211*a* at a position corresponding to that of a fastening hole 1*a* formed on the bottom of the monitor, so that the front base 200 can be engaged to the monitor 1 by hooking the fastening bracket into the fastening hole.

In order to prevent the fastening bracket 21 l*a* from being released from the fastening hole 1*a* when the front base 200 is shifted rearward relative to the monitor 1, the coupler 211 has on its rear portion a pair of rear fastening pieces 211*b* each detachably inserted into a sliding preventing hole 1*b* formed under the monitor.

The rear fastening piece 211*b* has a cantilever shape with one end being engaged to the coupler 211 and the other end being free, thereby causing the rear fastening piece to be resiliently moved downward by centering a portion coupled to the coupler 211. The rear fastening piece 211*b* has a lever 211*c* protruded downward from a lower portion of the free end to be operated by a finger, and a rearward bent hook 211*d*, formed on an upper portion of the free end, for inserting the sliding preventing hole 1*b* of the monitor 1.

Accordingly, if the fastening bracket 211*a* is inserted into the fastening hole 1*a* of the monitor 1, the hook 211*d* of the rear fastening piece is slidably inserted into the sliding preventing hole 1*b* of the monitor 1, so that the engagement of the coupler 211 of the front base 200 and the monitor 1 is maintained by the hook 211*d*.

In case it is necessary to release the monitor 1 from the coupler 211, if the lever 211*c* of the rear fastening piece 211*b* is pressed frontward, the rear fastening piece 211*b* is descended, and the hook 211*d* is released from the sliding preventing hole 1*b* of the monitor 1. At that time, the fastening bracket 211*a* is separated from the fastening bracket 211*a* by pulling rearward the front base 200.

The rear base 300, as shown in FIGS. 3 and 4, has a rounded shape of a desired curvature radius, and includes an upper cover 310 and a lower cover 320, the covers having the same shape.

Each end of the upper and lower covers 310 and 320 has recessed portions 311 and 321 for receiving a hinge shaft 410 and a torsion spring 440 of the resilient hinge assembly 400. The upper and lower covers are provided at a portion adjacent to the recessed portions 311 and 312 with a fixing hole 312 and a fixing boss 322 for engaging to the resilient hinge assembly 400. The upper and lower covers has at a portion contacted with the ground a rounded shape to minimize the friction between the ground and the covers.

The upper and lower covers 310 and 320 are provided at each corner with a number of fastening holes and bosses 313 and 323 for fastening the upper and lower covers. The inside of the lower cover 320 is provided with a number of reinforcing ribs 324 as the front base 200.

Figure 5:
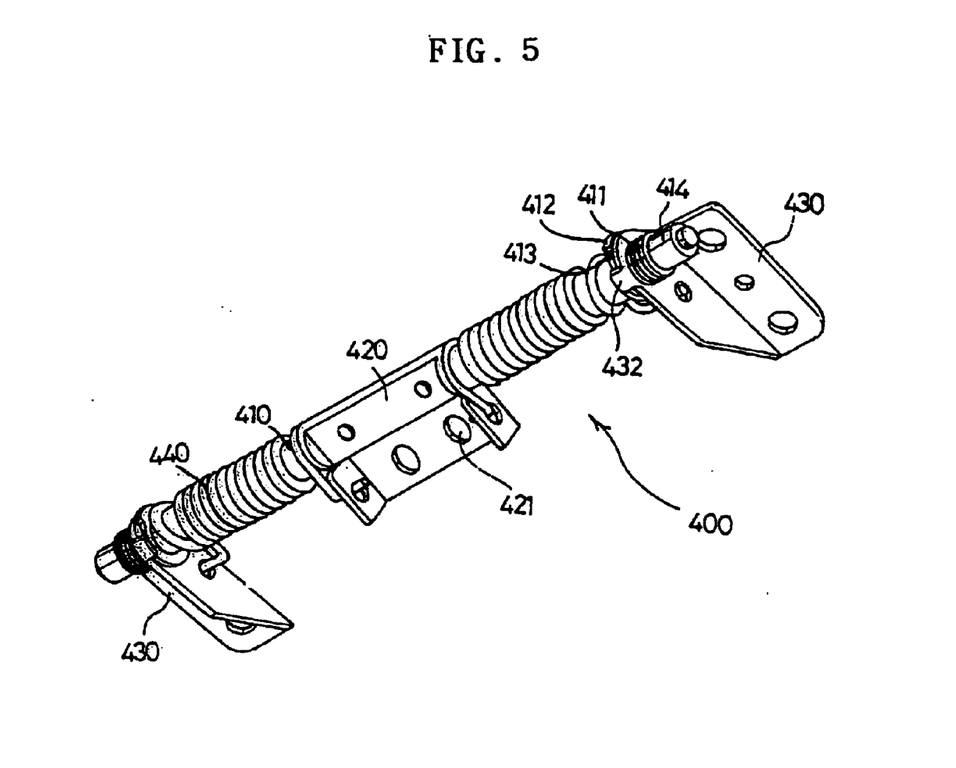
FIG. 5 is a perspective view of a resilient hinge assembly in FIG. 2.

The resilient hinge assembly 400, as shown in FIG. 5, includes a hinge shaft 410 rotatable by a biasing force of a spring, a mounting bracket 430 provided on both ends of the hinge shaft 410 to be engaged to the upper cover 210 of the front base 200, a fixing bracket 420 provided at a center of the hinge shaft 410 to be engaged to the fixing boss and hole 322 and 312 of the rear base 300, a torsion spring 440 provided on both ends of the hinge shaft 410, respectively, with one end engaged to the fixing bracket 420 and the other end engaged to the mounting bracket 430, a spring washer 411, provided on both ends of the hinge shaft 410, for controlling a tension of the torsion spring 440, and a locking nut 414 for pressing the spring washer 411 and for preventing the spring washer 411 from being released from the hinge shaft.

The mounting bracket 430 is provided on the hinge shaft 410 with a tilting angle setting member 432 with an arc-shaped groove 413 formed along a periphery thereof. The mounting bracket 430 is provided on a lower end thereof with a bent stopper 412, positioned in the groove 413 of the tilting angle setting member 432, for limiting the tilting angle of the hinge shaft 410.

Figure 6:
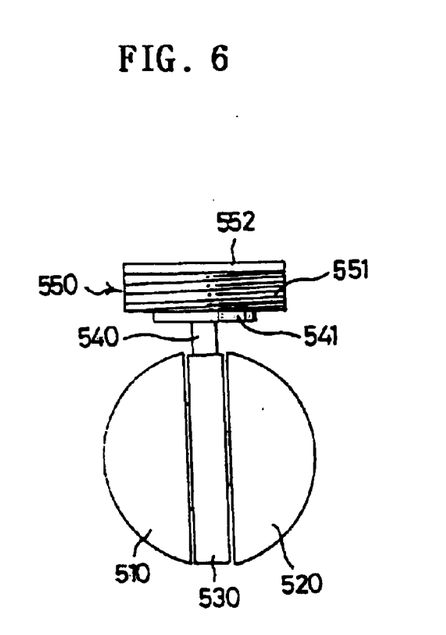
FIG. 6 is a front view of a caster mounted to a front base of a base assembly.
Figure 7:
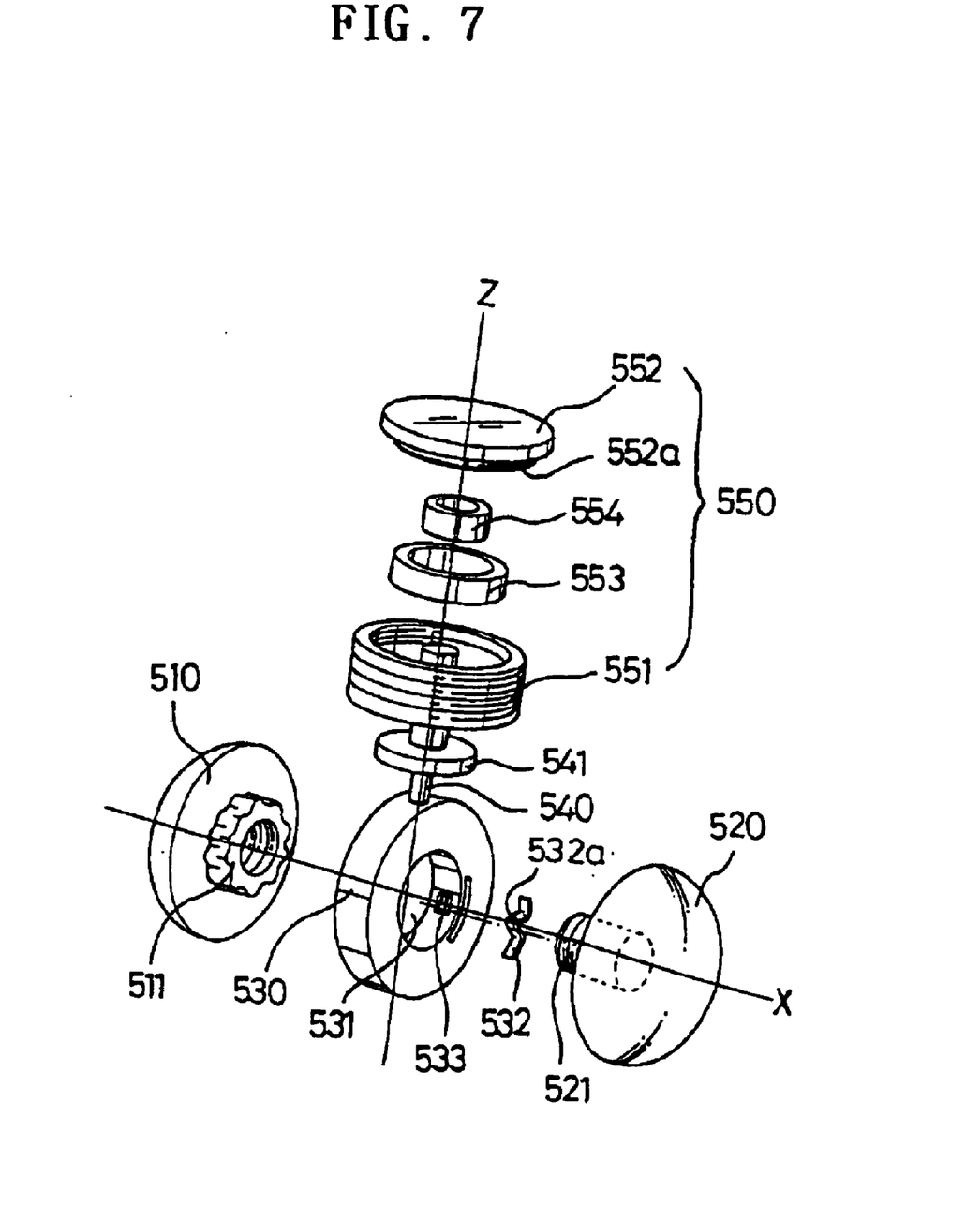
FIG. 7 is an exploded view of a caster.

The moving means 500 is made in a shape of a caster, and as shown in FIGS. 6 and 7, includes a first and second semi-spheres 510 and 520, which are engaged to form a sphere for rolling on the ground, a ring 530 with a penetrating hole 531 through which a coupling portion of the first and second semi-spheres 510 and 520 penetrates, and a bearing member 550 to which a bar 540 integrally formed on the ring is rotatably engaged.

The first semi-sphere 510 has to be rotatably engaged to the second semi-sphere 520 with the ring 530 interposed therebetween. To this end, the first semi-sphere 510 has a female threaded portion 511 on a flat surface thereof, and the second semi-sphere 520 has a male threaded portion 521 to be engaged to the female threaded portion 511 on a flat surface thereof, so that the male threaded portion is threadedly engaged to the female threaded portion. The female threaded portion 511 has an outer diameter smaller than a diameter of the penetrating hole 531 of the ring 530, so that the engaged first and second semi-spheres rotates freely.

Also, an outer periphery of the female threaded portion 511 of the first semi-sphere 510 has a circumference with a concave valley and a convex boss being continuously formed. A plate spring 532 having a protrusion 532*a* is inserted into a groove 533 formed on inner periphery of the penetrating hole 531 of the ring 530. If the first and second semi-spheres 510 and 520 penetrate through the penetrating hole 531 of the ring 530 to be engaged to each other, the protrusion 532*a* of the plate spring 532 is closely contacted with an outer periphery of the female threaded portion 511 of the first semi-sphere 510.

Therefore, due to the engagement of the plate spring 532 and the female threaded portion 511, the rotation of the first and second semi-spheres may be achieved by applying a predetermined amount of a rotating force to the semi-spheres.

The bearing member 550 of the moving means 500 includes a cylindrical bearing case 551 with a threaded portion formed on its outer periphery, a bearing 553 fittedly installed in the bearing case 551, a rotating ring 554 of a rubber material engaged to an end of the bar 540 having a same outer diameter as an inner diameter of the bearing 553, and positioned in an inner periphery of the bearing 553, and a cover 552 for the bearing case 551 by thready engaging to the inner periphery of the bearing case 551 at the upper surface of the bearing case 551.

A stopper 541 is integrally formed on a bottom of the bar 540, so that the stopper is positioned under the bearing case. If the ring 530 coupled to the bar 540 is pressed upward, the stopper 541 is obstructed by the bottom of the bearing case 551, thereby limiting the upward movement of the bar 540.

The assembly and operation of the base assembly according to the present invention will be explained in brief.

As shown in FIG. 4, after the fixing boss 322 of the lower cover 310 and the fixing hole 312 of the upper cover 310 are positioned in alignment with the hole 421 of the bracket 420 of the resilient hinge assembly 400, the resilient hinge assembly 400 is fastened to the rear base 300 by using a screw (not shown).

At that time, the upper and lower covers 310 and 320 of the rear base 300 are fastened by inserting a screw (not shown) into the fastening hole 313 and the fastening boss 323 formed at each corner.

The engaged resilient hinge assembly 400 and the rear base 300 is coupled to the rear of the front base 200. Specifically, the mounting bracket 430 of the resilient hinge assembly 400 is engaged to the fixing boss (not shown) formed on the end of the upper cover 210 of the front base 200.

And then, after the upper cover 210 of the front base 200 is laid on the lower cover 220, the covers are fastening by inserting a screw (not shown) into the fastening boss 213 and the fastening hole 223.

Finally, the threaded portion of the bearing case 551 of the moving means is fastened to the threaded portion 212 each formed both front ends of the front base 200.

The assembly of the moving means 500 will now be explained.

The plate spring 532 is mounted into the groove 533 of the ring 530, and the male threaded portion 521 of the second semi-sphere 520 is threaded to the female threaded portion 511 of the first semi-sphere 510 through the penetrating hole 531 of the ring 530 to assembly the first and second semi-spheres 510 and 520.

And then, after the bearing 553 is positioned in the bearing case 551 of the bearing member 550, the bar 540 integrally formed on the upper end of the ring 530 is inserted into the bottom of the bearing case 551. The rotating ring 554 is inserted into the end of the bar 540, and is engaged to the inner periphery of the bearing 553.

The assembly of the bearing member and the ring is completed by threading the threaded portion 552a of the bearing case cover 552 into the upper inner periphery of the bearing case 551.

The adjusting operation of the tilting angle and swiveling angle of the base assembly for video display appliance according to the present invention will now be explained in detail.

Since the monitor 1 is designed so that the center of gravity of the monitor is positioned at a front of the hinge shaft 410 of the hinge assembly 400, the weight of the monitor is acted on the rear base 300 acting as means for adjusting tilting angle, so that a desired torque is acted on the hinge shaft 410 of the hinge assembly 400.

Accordingly, since a desired torsion moment is acted on the torsion spring 440 of the resilient hinge assembly 400 by the torque acting on the hinge shaft 410, the torsion spring 440 offsets the torsion moment produced from the weight of the monitor to maintain the moment equilibrium of the system.

To this end, the torsion spring 440 of the resilient hinge assembly 400 is designed to produce a torque acting in the opposite direction relative to the torque acting on the hinge shaft 410 due to the weight of the monitor 1, thereby maintaining the moment equilibrium of the system.

The operation of the base assembly according to the present invention will now be explained in detail with reference to FIGS. 8A to 8C.

Figure 8A:
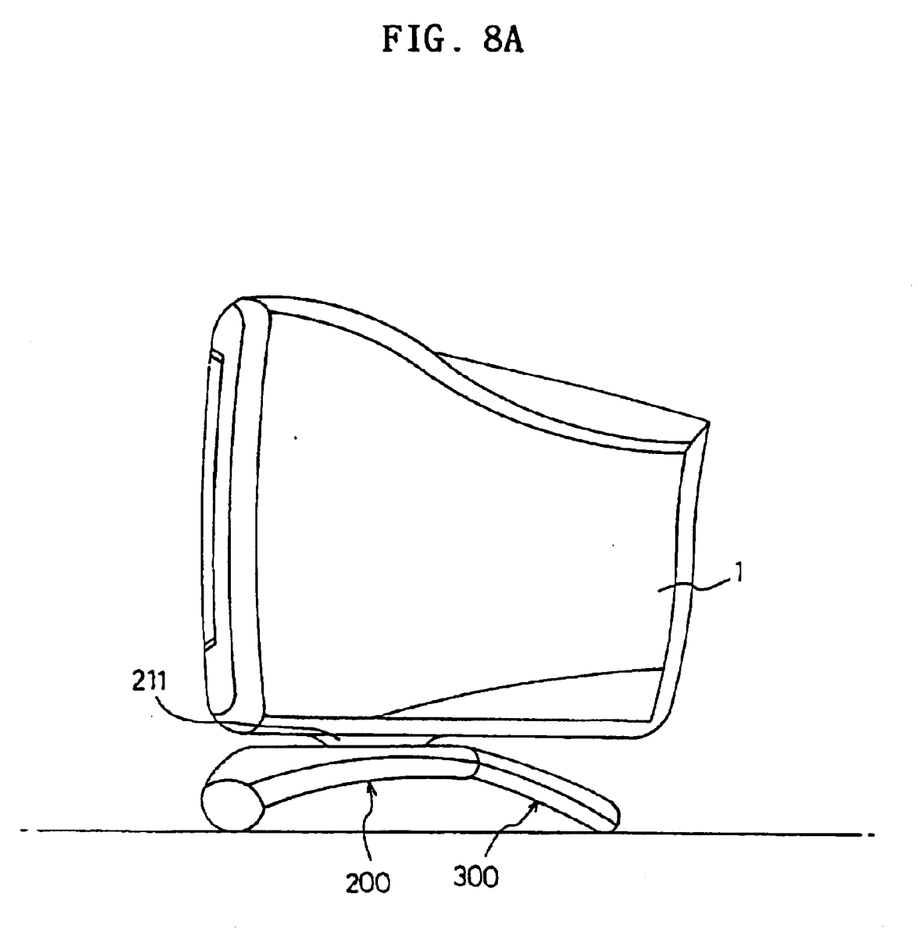

In an initial state where no load acts on the tilting angle adjusting mechanism, if the monitor is positioned on a horizontal surface, each elevation angle and declination angle of the monitor is set to 0° relative to the horizontal surface, as shown in FIG. 8A.

Specifically, in an initial state where no load acts on the rear base, if the monitor is positioned on a horizontal surface, an amount of the torsion moment acting on the torsion spring of the resilient hinge assembly 400 due to the weight of the monitor exceeds to the amount of the torsion moment that the torsion spring 440 can stand against the deformation. Therefore, the hinge shaft 410 of the resilient hinge assembly 400 overcomes the restoring force of the torsion spring 440, so that the hinge shaft can be rotated in a counterclockwise direction as shown in the figure.

At that time, since the restoring force of the torsion spring 440 is increased relative to the rotating amount of the hinge shaft 410 in a counterclockwise direction, the torsion moment of the torsion spring 440 is also increased.

If the tilting angle adjusting mechanism is rotated by a desired angle in a counterclockwise direction as shown in FIG. 8A, the amount of the torsion moment acting on the hinge shaft 410 is the same as the amount of the torsion moment of the torsion spring 440, so that the monitor is maintained in a state of moment equilibrium.

When the monitor is set in a horizontal state, the rear base 300 is rotated to a desired angle in such a direction that an angle between the tilting angle adjusting mechanism and the lower base cover is increased, and then the tilting angle adjusting mechanism is stopped at a position of the moment equilibrium.

Figure 8B:
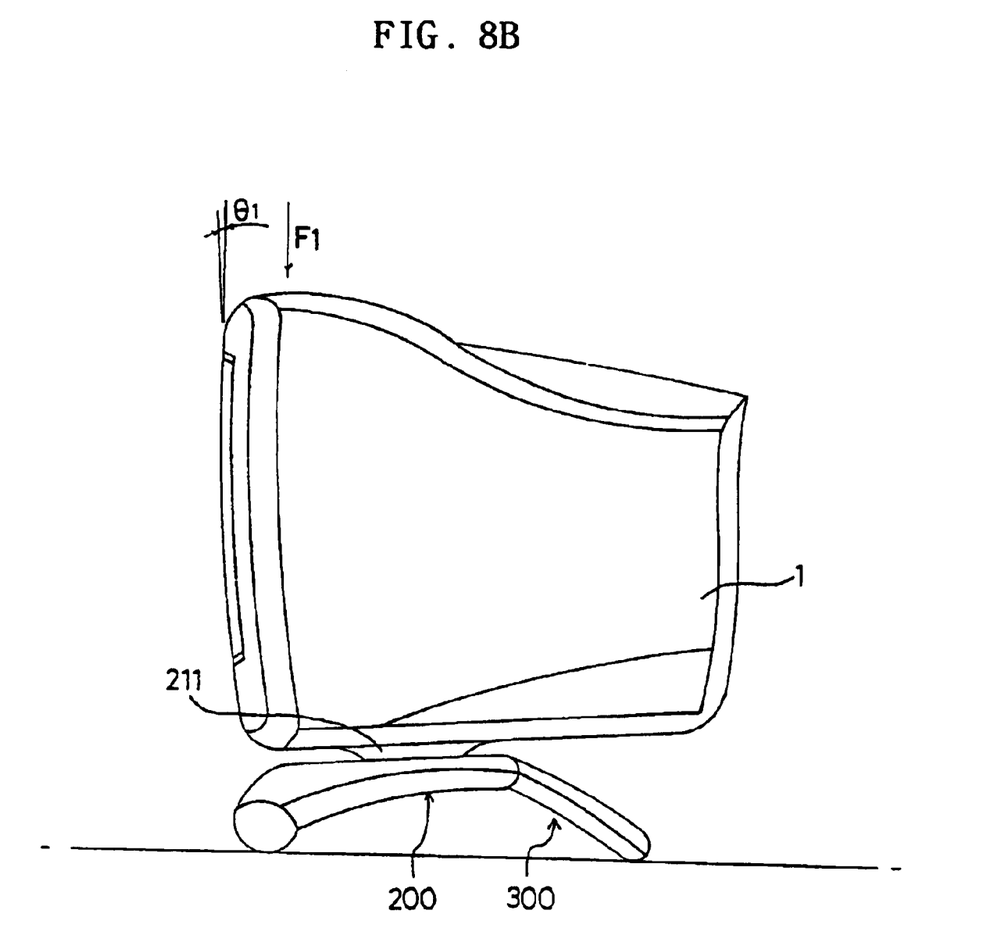

FIG. 8B shows a state in which an elevation angle of the monitor is set to a maximum magnitude. In a state where the monitor 1 is horizontally set, if a pulling force $F_1$ is applied to the front upper end of the monitor, the hinge shaft 410 of the resilient hinge assembly 400 is applied with a more rotating moment, so that the moment equilibrium is broken off. Accordingly, until the monitor comes to a moment equilibrium, the rear base 300 rotates in a counterclockwise direction, so that the elevation angle of the monitor is increased.

At that time, the elevation angle of the monitor is increased relative to the magnitude of the force $F_1$ applied to the front upper end of the monitor, and the elevation angle of the monitor does not exceed to a predetermined angle.

Figure 8C:
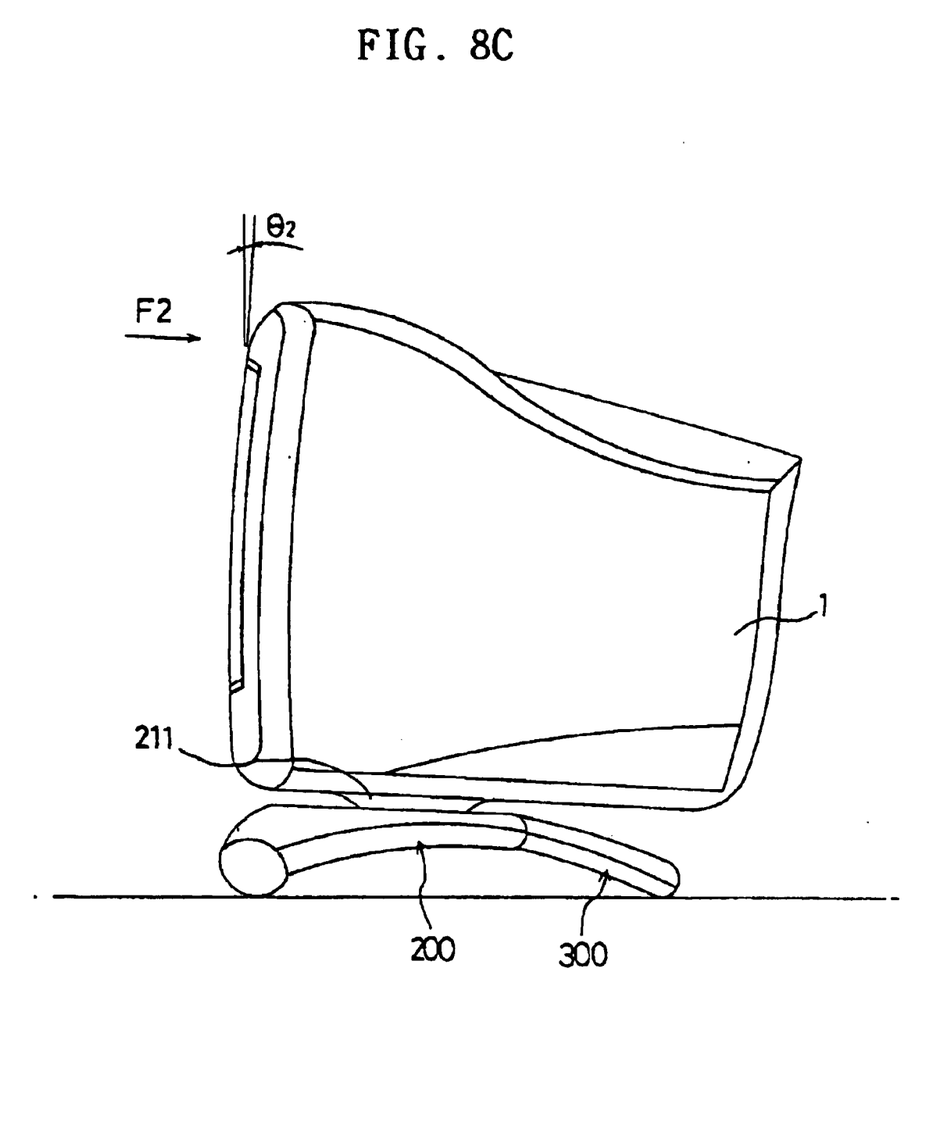

FIG. 8C shows a state in which a declination angle of the monitor is set to a maximum magnitude. In a state where the monitor 1 is horizontally set as described above, if a desired force $F_2$ is applied to the front upper end of the monitor, the rotating moment acting on the hinge shaft 410 of the resilient hinge assembly 400 is decreased, so that the moment equilibrium is broken off. Accordingly, until the monitor comes to a moment equilibrium, the rear base rotates in a clockwise direction, so that the declination angle $\theta_2$ of the monitor is increased.

At that time, the declination angle $\theta_2$ of the monitor relative to the magnitude of the force $F_2$ applied to the front upper end of the monitor, does not exceed a maximum declination angle or predetermined angle.

Different from the prior art, since the weight of the monitor is supported by the restoring force of the torsion spring 440 provided on the hinge shaft 410 of the hinge assembly 400, the tilting angle of the monitor may be easily adjusted by applying a slight operating force to the monitor.

Since the moment equilibrium of the monitor is broken off by a slight force, after the tilting angle of the monitor is adjusted, the moment equilibrium thereof may be again maintained. Accordingly, the user may adjust the tilting angle of the monitor easily.

As described above, both ends of the resilient hinge assembly 400 are engaged to the tilting angle setting member 432. Therefore, when the hinge shaft 410 is rotated by applying a force to the monitor, the stopper 412 of the mounting bracket 430 is in contact with the end of the tilting angle setting member 432, thereby preventing the monitor from being further tilted.

Therefore, the adjusting range of tilting angle of the monitor is determined by the range of the rotating angle of the stopper 432 in the groove 413.

The adjustment of the swiveling angle of the monitor 1 is achieved by applying the rotating force to the monitor with both hands grasping both sides of the monitor, so that the monitor can be rotated by a desired angle in a desired direction.

The operation of the moving means of the base assembly according to the present invention will now be explained.

The base assembly according to the present invention includes moving means for freely moving the monitor and adjusting the swiveling angle of the monitor, and the moving means consists of two moving means 500, such as a caster, on both front sides of the front base 200.

Accordingly, the user transfer the monitor by pulling and pushing the monitor with both hands.

At that time, the first and second semi-spheres 510 and 520 of the moving means 500 rotates around an x-axis, and if the force is applied to the first and second semi-spheres 510 and 520 in any direction besides a diameter direction, the rotating ring 54 engaged to the bar 540 can freely rotate around a z-axis in a direction of applied force by the bearing 553.

Therefore, the first and second semi-spheres 510 and 520 can rotate around a z-axis as well as an x-axis, thereby allowing the rotation of the moving means 500 in two axes. The moving means 500 can be moved by the shift of the rolling direction.

The protrusion 532a of the plate spring 532 mounted on the inner periphery of the ring 530 is closely engaged to the outer periphery of the female threaded portion 511 of the first semi-sphere 510, thereby allowing the first and second semi-spheres 510 and 520 to rotate.

Specifically, if a force is applied to the first and second semi-spheres 510 and 520 by pushing or pulling the monitor, the female threaded portion 511 of the first semi-sphere 510 overcomes the resilient force of the plate spring 532 to be rotated by pushing out the protrusion 532a. If the monitor reaches to a desired position, the force applied to the monitor is disappeared, and the outer periphery of the first semi-sphere 510 is not further rotated by the protrusion 532a.

Accordingly, in the state where any force is not applied to the monitor, the monitor cannot be moved, while the monitor can be moved by the moving means by applying an adequate force to the monitor.

While the present invention has been described and illustrated herein with reference to the preferred embodiment thereof, it will be understood by those skilled in the art that various changes in form and details may be made therein without departing from the spirit and scope of the invention.

What is claimed is:

1. A base assembly for a video display appliance having a monitor, the base assembly comprising:
   a front base having a coupler coupled to a bottom of the monitor;
   a moving means attached to the front base for rolling on a horizontal surface;
   a rear base positioned adjacent to a rear of the front base along a substantially horizontal plane; and
   a resilient hinge assembly configured to pivotally attach the rear of the front base to a front of the rear base, for changing a tilting angle of the monitor.

2. The base assembly as claimed in claim 1, wherein the resilient hinge assembly comprises:
   a hinge shaft rotatable by a biasing force of a spring;
   a mounting bracket provided on both ends of the hinge shaft to be engaged to the upper cover of the front base;
   a fixing bracket provided at a center of the hinge shaft to be engaged to the fixing boss and hole of the rear base; and
   a torsion spring provided on both ends of the hinge shaft, respectively, with one end engaged to the fixing bracket and the other end engaged to the mounting bracket.

3. The base assembly as claimed in claim 1, wherein the front base comprises an upper cover and a lower cover having a shape corresponding to that of the upper cover and configured to engage with the upper cover, and the rear base comprises a rounded upper cover and a lower cover having a shape corresponding to that of the upper cover and configured to engage with the upper cover.

4. The base assembly as claimed in claim 1, wherein the upper cover comprises:
   a fixing boss for fixing the mounting bracket of the resilient hinge assembly;
   a plurality of fastening bosses, for fastening the upper cover to the lower cover; and
   a plurality of reinforcing ribs arranged in a vertical and a horizontal direction.

5. The base assembly as claimed in claim 1, wherein the moving means comprises:
   a first semi-sphere;
   a second semi-sphere engaged to the first semi-sphere;
   a ring with a penetrating hole through which coupling portions of the first and second semi-spheres penetrate; and a bearing member to which a bar integrally formed on the ring is rotatably engaged.

6. The base assembly as claimed in claim 5, wherein the first semi-sphere has a female threaded portion on a flat surface thereof, the second semi-sphere has a male threaded portion to be engaged to the female threaded portion on a flat surface thereof, and the female threaded portion has an outer diameter smaller than a diameter of the penetrating hole of the ring.

7. The base assembly as claimed in claim 5, wherein an outer periphery of the female threaded portion of the first semi-sphere has a circumference with a concave valley and a convex boss being continuously formed, wherein a plate spring having a protrusion is inserted into a groove formed on an inner periphery of the penetrating hole of the ring, and wherein when the first and second semi-spheres penetrate through the penetrating hole of the ring to be engaged to each other, the protrusion of the plate spring is closely contacted with an outer periphery of the female threaded portion of the first semi-sphere, thereby adjusting the rotation of the first and second semi-spheres.

8. The base assembly as claimed in claim 5, wherein the bearing member comprises:
   a cylindrical bearing case with a threaded portion formed on its outer periphery;
   a bearing installed in the bearing case;
   a rotating ring positioned in an inner periphery of the bearing and coupled to an end of the bar; and
   a cover for the bearing case.

9. The base assembly as claimed in claim 3, wherein threaded portions are formed on inner sides of the upper and lower covers, and the bearing member of the moving means is engaged to the threaded portions.

10. The base assembly as claimed in claim 1, wherein the resilient hinge assembly is configured so as to allow adjustment of a tilting angle of a monitor by application of an operating force upward or downward to the monitor.

11. The base assembly as claimed in claim 1, wherein the moving means is configured to allow for movement in the x- and z-directions.

12. The base assembly as claimed in claim 1, wherein the resilient hinge assembly comprises a horizontally extending hinge shaft which pivotally attaches the rear base to the front base.

13. A video display appliance comprising the base assembly of claim 1.

14. The base assembly as claimed in claim 5, wherein the first and second semi-spheres are engaged to form a sphere for rolling on a horizontal surface.

15. The base assembly as claimed in claim 14, wherein the engaged first and second semi-spheres are configured to rotate freely in various directions.

16. The base assembly as claimed in claim 9, wherein the threaded portions are formed on front inner sides of the upper and lower covers of the front base.

17. A base assembly for a display device, comprising:
   a front base;
   a rear base positioned adjacent to the front base along a substantially horizontal plane; and
   a resilient hinge assembly configured to pivotally attach the front base and the rear base and to allow adjustment of the orientation of a display device mounted on said base assembly.

18. The base assembly as claimed in claim 17, further comprising a moving assembly attached to the front base and configured to roll on a horizontal surface.

19. The base assembly as claimed in claim 18, wherein the moving assembly is configured to allow for movement in the x- and z-directions.

20. The base assembly as claimed in claim 17, further comprising a coupling device configured to allow mounting of a display device onto the base assembly.

21. The base assembly as claimed in claim 17, wherein the rear base is pivotally engaged to a rear of the front base.

22. The base assembly as claimed in claim 17, wherein the resilient hinge assembly comprises a horizontally extending hinge shaft which pivotally attaches the rear base to the front base.

23. The base assembly as claimed in claim 17, wherein the resilient hinge assembly comprises:
   a hinge shaft rotatable by a biasing force;
   a mounting bracket pivotally engaging an upper cover of the front base;
   a fixing bracket configured to be attached to the hinge shaft and the rear base; and
   a resilient device configured to engage the fixing bracket and the mounting bracket.

24. The base assembly as claimed in claim 23, wherein the mounting bracket is provided on both ends of a hinge shaft.

25. The base assembly as claimed in claim 23, wherein the resilient device comprises a torsion spring provided on each end of the hinge shaft.

26. The base assembly as claimed in claim 17, wherein the moving means comprises:
   a first semi-sphere;
   a second semi-sphere engaged to the first semi-sphere;
   a ring with a penetrating hole through which coupling portions of the first and second semi-spheres penetrate; and
   a bearing member to which a bar integrally formed on the ring is rotatably engaged.

27. The base assembly as claimed in claim 26, wherein the bearing member comprises:
   a cylindrical bearing case with a threaded portion formed on its outer periphery;
   a bearing installed in the bearing case;
   a rotating ring positioned in an inner periphery of the bearing and coupled to an end of the bar; and
   a cover for the bearing case.

28. The base assembly as claimed in claim 26, wherein threaded portions are formed on front inner sides of the front base, and the bearing member of the moving means is, engaged to the threaded portions.

29. A display device comprising the base assembly of claim 17.

* * * * *